(12) United States Patent
Mohler et al.

(10) Patent No.: US 7,035,513 B2
(45) Date of Patent: Apr. 25, 2006

(54) FIBER OPTIC DROP CABLES SUITABLE FOR OUTDOOR FIBER TO THE SUBSCRIBER APPLICATIONS

(75) Inventors: James D. Mohler, Kernersville, NC (US); David A. Seddon, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 92 days.

(21) Appl. No.: 10/809,619

(22) Filed: Mar. 25, 2004

(65) Prior Publication Data
US 2005/0213903 A1    Sep. 29, 2005

(51) Int. Cl.
*G02B 6/44* (2006.01)
(52) U.S. Cl. ............................ 385/113; 385/103
(58) Field of Classification Search ............. 385/113, 385/101, 103, 105, 109, 110, 112
See application file for complete search history.

(56) References Cited

U.S. PATENT DOCUMENTS

| | | | |
|---|---|---|---|
| 4,467,138 A | 8/1984 | Brorein | 174/115 |
| 4,729,628 A | 3/1988 | Kraft et al. | 350/96.23 |
| 4,761,053 A | 8/1988 | Cogelia et al. | 350/96.23 |
| 4,776,664 A | 10/1988 | Okura | 350/96.23 |
| 4,787,705 A | 11/1988 | Shinmoto et al. | 350/96.23 |
| 4,856,867 A * | 8/1989 | Gaylin | 385/113 |
| 4,892,382 A | 1/1990 | Story et al. | 350/96.23 |
| 4,975,232 A * | 12/1990 | Hattori et al. | 264/137 |
| 5,050,957 A * | 9/1991 | Hamilton et al. | 385/113 |
| 5,180,890 A | 1/1993 | Pendergrass et al. | 174/117 |
| 5,561,729 A | 10/1996 | Parris | 385/113 |
| 5,566,266 A | 10/1996 | Nave et al. | 285/113 |
| 5,651,081 A | 7/1997 | Blew et al. | 385/101 |
| 6,188,821 B1 | 2/2001 | McAlpine et al. | 385/100 |
| 6,249,629 B1 | 6/2001 | Bringuier | 385/113 |
| 6,311,000 B1 | 10/2001 | Schneider | 385/113 |
| 6,356,690 B1 | 3/2002 | McAlpine et al. | 385/109 |
| 6,400,873 B1 | 6/2002 | Gimblet et al. | 385/102 |
| 6,487,345 B1 | 11/2002 | Dixon et al. | 385/100 |
| 6,487,347 B1 | 11/2002 | Bringuier | 385/113 |

(Continued)

OTHER PUBLICATIONS

NEPTCO Incorporated "Fiber Optic Cable Components", Apr. 2003.

(Continued)

*Primary Examiner*—Brian Healy
*Assistant Examiner*—Charlie Peng
(74) *Attorney, Agent, or Firm*—Michael E. Carroll, Jr.

(57) ABSTRACT

A figure-eight fiber optic drop cable includes a messenger section and a carrier section connected by a web. The carrier section has at least one optical waveguide and at least one roving. In one embodiment, the carrier section has an average shrinkage of about 0.5% or less when separated from the messenger section during an average shrinkage test. Also the carrier section of the figure-eight fiber optic drop cable can have an average coefficient of thermal expansion (CTE) section after being separated from the messenger section of about $5.0 \times 10^{-3}\%/^\circ$ C. or less for preserving optical performance. Furthermore, a maximum delta attenuation of the at least one optical waveguide during thermal cycling may be about 0.3 dB/20 meters or less at a reference wavelength of about 1550 nm at a temperature of about $-40°$ C. Other cable configurations are also possible with the invention.

54 Claims, 7 Drawing Sheets

U.S. PATENT DOCUMENTS

| | | | |
|---|---|---|---|
| 6,501,888 B1 | 12/2002 | Gimblet et al. | 385/113 |
| 6,529,663 B1 | 3/2003 | Parris et al. | 385/113 |
| 6,542,674 B1 | 4/2003 | Gimblet | 385/113 |
| 6,546,175 B1 | 4/2003 | Wagman et al. | 385/113 |
| 6,563,990 B1 | 5/2003 | Hurley et al. | 385/101 |
| 6,909,829 B1 * | 6/2005 | Register et al. | 385/114 |
| 6,925,235 B1 * | 8/2005 | Lanier et al. | 385/100 |

OTHER PUBLICATIONS

Perelli, "ResiLink LT™ Drop Cables", Jul. 2002.
Perelli, "ResiLink™ Drop Cable", Jan, 2002.
Sumitomo Cable Specification "Self-Supporting Figure-8 Sheath Optical Fiber Service Drop Cable with Stranded Steel Messenger", Nov. 2003.

* cited by examiner

FIBER OPTIC DROP CABLES SUITABLE FOR OUTDOOR FIBER TO THE SUBSCRIBER APPLICATIONS

FIELD OF THE INVENTION

The present invention relates generally to fiber optic drop cables. More specifically, the invention relates to low-cost fiber optic drop cables having enhanced performance characteristics for preserving optical performance in outdoor applications such as fiber to the subscriber.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data. Consequently, optical waveguide cables replaced most of the copper cables in long-haul communication network links, thereby providing greater bandwidth capacity for long-haul links. However, most communication networks use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the long-hauls links.

As optical waveguides are deployed deeper into communication networks, subscribers will have access to increased bandwidth. But there are certain obstacles that make it challenging and/or expensive to route optical waveguides/ optical cables deeper into the communication network, i.e., closer to the subscriber. For instance, laying the last mile of fiber to the subscriber requires a low-cost fiber optic cable that is craft-friendly for installation, connectorization, slack storage, and versitilty Moreover, the reliability and robustness of the fiber optic cable must withstand the rigors of an outdoor environment.

FIG. 1 schematically illustrates two different methods for routing fiber optic cables to a premises 19. Specifically, FIG. 1 shows a first method of routing a figure-eight cable 10 to premises 19 in an aerial application and a second method using a cable 10' routed to premises 19 in a buried application. In aerial applications, cable 10 may be a figure-eight cable having a first end 10a that is attached at a first interface device 12 located on pole 11 and a second end 10b that is merely a portion of cable 10 that is routed to an interface device 14 at premises 19. Specifically, figure-eight cables have a messenger section and a carrier section that can be split apart near premises 19. More specifically, messenger section can include a conductive strength member for carrying the tensile load of cable 10 and is terminated and attached with a clamp positioned at a tie point 19a of premises 19. Carrier section of figure-eight cable 10 includes one or more optical fibers therein and is routed along a side of premises 19 to interface device 14. In buried applications, the first and second ends of cable 10' are respectively routed to pedestal 18 and connected to interface device 16 and routed and connected to interface device 14.

One such figure-eight drop cable is disclosed in U.S. Pat. No. 6,546,175 and preferably has a carrier section that does not include strength members. The carrier section of this cable is flexible when split from the messenger section for slack storage; however, the carrier section does not have anti-buckling members so the polymer materials of the carrier section may shrink with environmental temperature changes, thereby causing elevated levels of optical attenuation. Another figure-eight drop cable is disclosed in U.S. Pat. No. 6,356,690 having a carrier section with strength members that provide anti-bucking to the carrier section. Strength members may be a material such as steel that aids in inhibiting the shrinkage of the carrier section; however, the steel strength members make the carrier section relatively stiff, thereby inhibiting slack storage. In other words, the strength members increase the bending radius of the carrier section and when coiled the strength members act like a coiled spring that wants to unwind. Moreover, the potential for elevated attenuation still exists.

Cables have used other strength members such as conventional fiberglass yarns, but they provide less anti-buckling strength than rigid strength members. U.S. Pat. No. 6,487,347 discloses an optical cable using conventional fiberglass yarns; however, the cable requires a relatively large number of flexible strength members for adequate performance. The use of a relatively large number of conventional fiberglass yarns increases the manufacturing complexity, increases the cost of the cable, and makes the cable relatively stiff. Thus, this cable does not meet all of the requirements for a drop cable that is suitable for routing optical waveguides to the subscriber.

DETAILED DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

Figure 1:
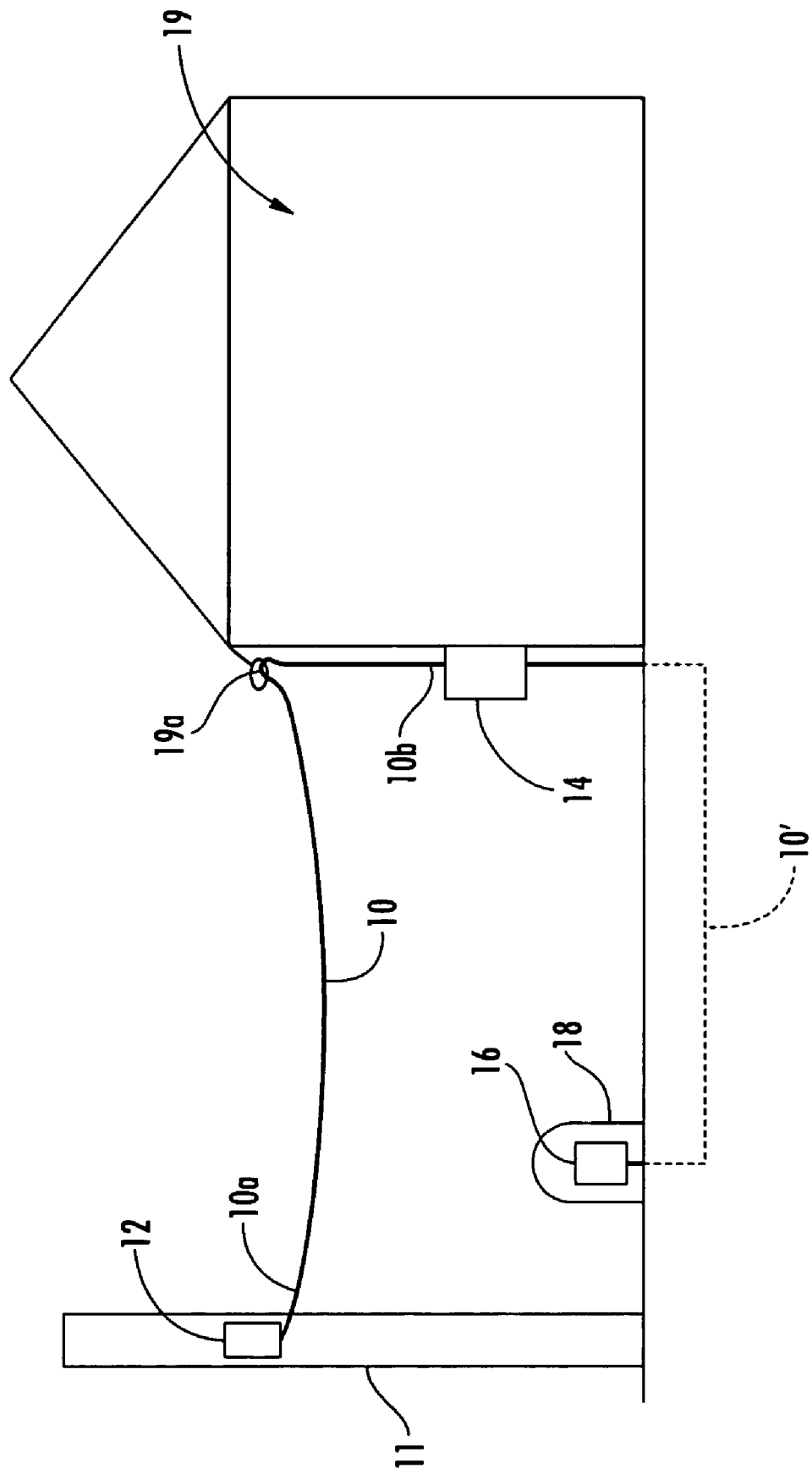
FIG. 1 schematically illustrates two methods for routing a fiber optic drop cable to a premises.
Figure 2:
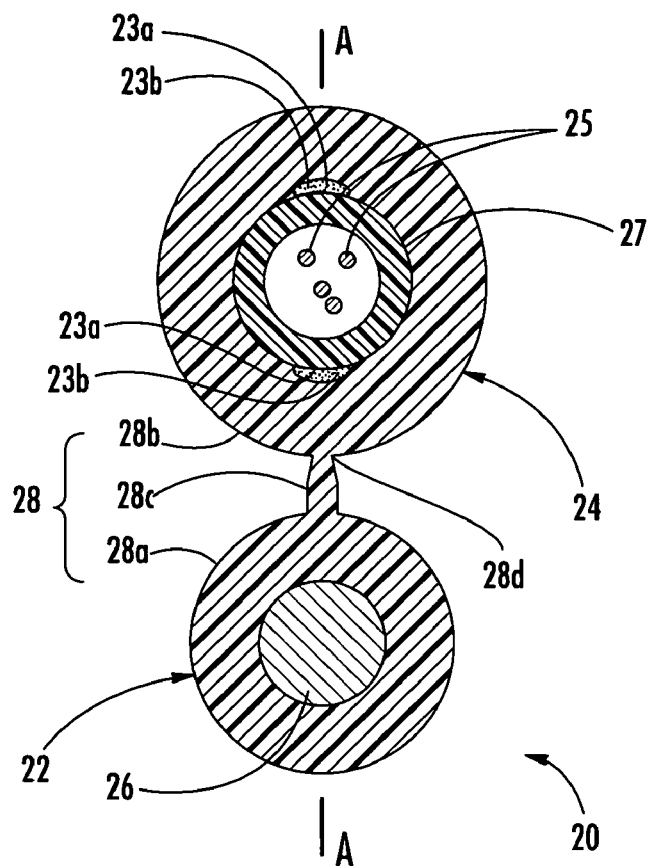
FIG. 2 is a cross-sectional view of a figure-eight fiber optic drop cable according to the present invention.
Figure 3:
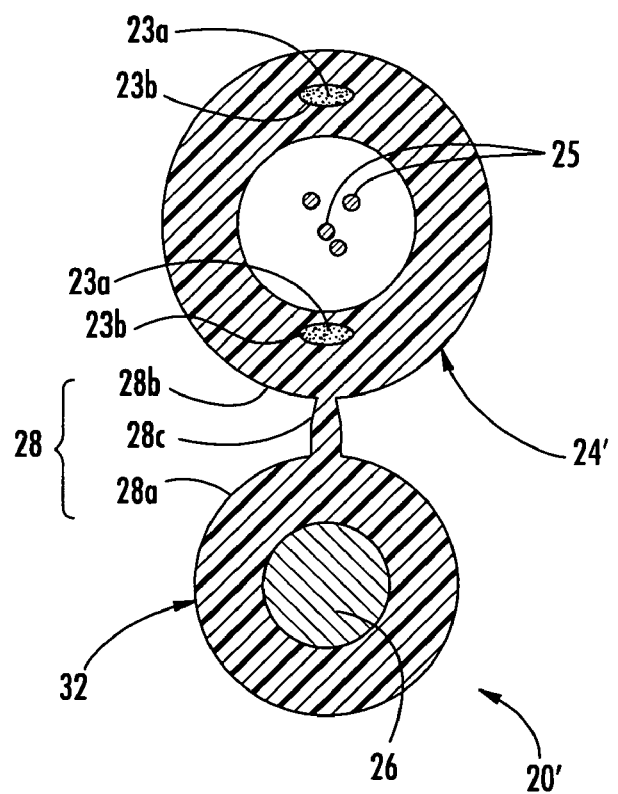
FIG. 3 is a cross-sectional view of another figure-eight fiber optic cable according to the present invention.

Illustrated in FIG. 2 is an exemplary figure-eight drop cable 20 (hereinafter cable 20) according to one embodiment of the present invention. Cable 20 includes a messenger section 22 and a carrier section 24 having at least one roving 23 and at least one optical waveguide 25 therein. As depicted, optical waveguides 25 are loose, but they may have other configurations. Messenger section 22 has a messenger jacket 28a and carrier section 24 has a carrier jacket 28b connected by a web 28c. Web 28c also includes a preferential tear portion 28d to aid in separation of carrier and messenger sections 22,24. Messenger section 22 also includes a strength component 26 for carrying tensile loads applied to cable 20. Strength component 26 is shown as a steel rod, but it may be a stranded wire. Additionally, cables of the present invention can include a strength component as disclosed in U.S. patent application Ser. No. 10/623,231 filed on Jul. 18, 2003 titled "Fiber Optic Cable having a Strength Member", the disclosure of which is incorporated herein by reference. Likewise, other suitable materials such as dielectrics or other conductive materials are possible for strength component 26. In this embodiment, carrier section 24 also includes a tube 27 for housing at least one optical waveguide 25. FIG. 3 shows a similar cable 20', which is a tubeless configuration. Additionally, rovings 23 of cable 20' are embedded within carrier jacket 28b, which may further improve performance characteristics of the cable. Cables 20 and 20' may also include other suitable components such as a plurality of ripcords (not shown), thereby allowing the craftsman to easily remove carrier jacket 38b from carrier section 34. Likewise, cables 20 and 20' may include a thixotropic material for water-blocking or they can alternatively have a dry construction. Other suitable cable components include tapes and yarns having as water-swellable or flame-retardant characteristics, armor, binder threads for fiber bundles or securing tapes, or any other suitable cable component.

As depicted in FIG. 2, cable 20 includes two rovings 23 generally aligned on a plane A—A that generally passes through strength component 26 and web 28c. In other words, rovings 23 are disposed at six o'clock and twelve o'clock positions, thereby imparting a preferential bend characteristic to cable 20. But, of course, other suitable positions for rovings 23 and/or other suitable numbers of rovings 23 are possible using the concepts of the present invention. For instance, cables according to the present invention can have more than two rovings 23; however, cables requiring fewer rovings advantageously reduce material costs for the cable. Cables of the present invention preferably have four or fewer rovings 23, more preferably two rovings 23, but other suitable numbers of rovings 23 may be used with the concepts of the present invention. Providing a reliable low-cost cable is advantageous since drop cables will generally have relatively low optical waveguide counts and require large length quantities to provide access for many subscribers. Moreover, providing access for many subscribers is labor intensive, thereby making it relatively expensive. Thus, cable costs should be relatively low for drop cables.

Cables according to the present invention provide a low-cost drop cable having enhanced performance characteristics for preserving optical performance in outdoor applications such as fiber to the subscriber. Moreover, cables according to the present invention accomplish superior performance levels because unlike conventional cables they provide improved anti-buckling performance in a flexible design. For instance, when carrier section 24 is separated from messenger section 22 in cable 20, the carrier section 24 generally has a lower average shrinkage and a lower average coefficient of thermal expansion (CTE) compared with conventional cables.

Consequently, in figure-eight cable designs carrier section 24 can be separated from messenger section 22 while maintaining a maximum delta attenuation of optical waveguides 25 at about 0.3 dB/20 meters or less, more preferably about 0.1 dB/20 meters or less during temperature cycling at a reference wavelength of 1550 nm at a temperature of about −40° C. after heat aging at 70° C. On the other hand, conventional figure-eight cables have elevated levels of shrinkage and/or CTE when the carrier and messenger section are separated, thereby causing elevated levels of optical attenuation. Thus, conventional figure-eight cables are generally inoperable for aerial or buried applications where the carrier and messenger sections are separated. Additionally, cables according to the present invention have a relatively low-cost since a relatively large number of strength members are not required as with conventional cables. Moreover, cables according to the present invention are craft-friendly for connectorization and slack storage making them highly desirable for fiber to the subscriber applications.

Cables of the present invention have at least one roving 23 that comprises a plurality of glass fibers 23a having a resin matrix 23b thereon. In preferred embodiments, glass fibers 23a are an e-glass, but other suitable types of glass fibers can be used for roving 23. Glass fibers 23a are about 90% or more by weight and resin matrix 23b is about 10% or less by weight. In preferred embodiments, glass fibers comprise about 93% or more by weight, and more preferably about 95%, and resin matrix is about 7% or less by weight, more preferably about 5%. Resin matrix 23b comprises a water-based acrylic composition that includes an ethylene-acrylic acid. Suitable rovings 23 are available from Neptco, Incorporated of Pawtucket, R.I. under the RPLPE tradename.

Several different experiments were conducted to investigate the performance of figure-eight cables according to the present invention compared with conventional figure-eight cables having a similar construction. The cables of the present invention and the conventional cables had similar constructions and processing parameters expect where noted otherwise. Specifically, the cables of the experiments included either four or twelve SMF-28e single-mode optical fibers commercially available from Corning, Incorporated in a polybutylene terephtalate (PBT) buffer tube having a 2.85 mm OD and a 2.05 mm ID. The cables were manufactured with an excess fiber length of about 0.0. The tested figure-eight cables differed in that the conventional cables included either two or four fiberglass strands available from Owens-Corning, Incorporated under the tradename CR-785. On the other hand, the tested cables of the present invention included rovings 23 which were from NEPTCO Incorporated under the tradename RPLPE 675. The strength components of the messenger sections were a solid steel rod.

Additionally, the jackets of all of the cables were formed from the same medium-density polyethylene (MDPE).

Figure 4:
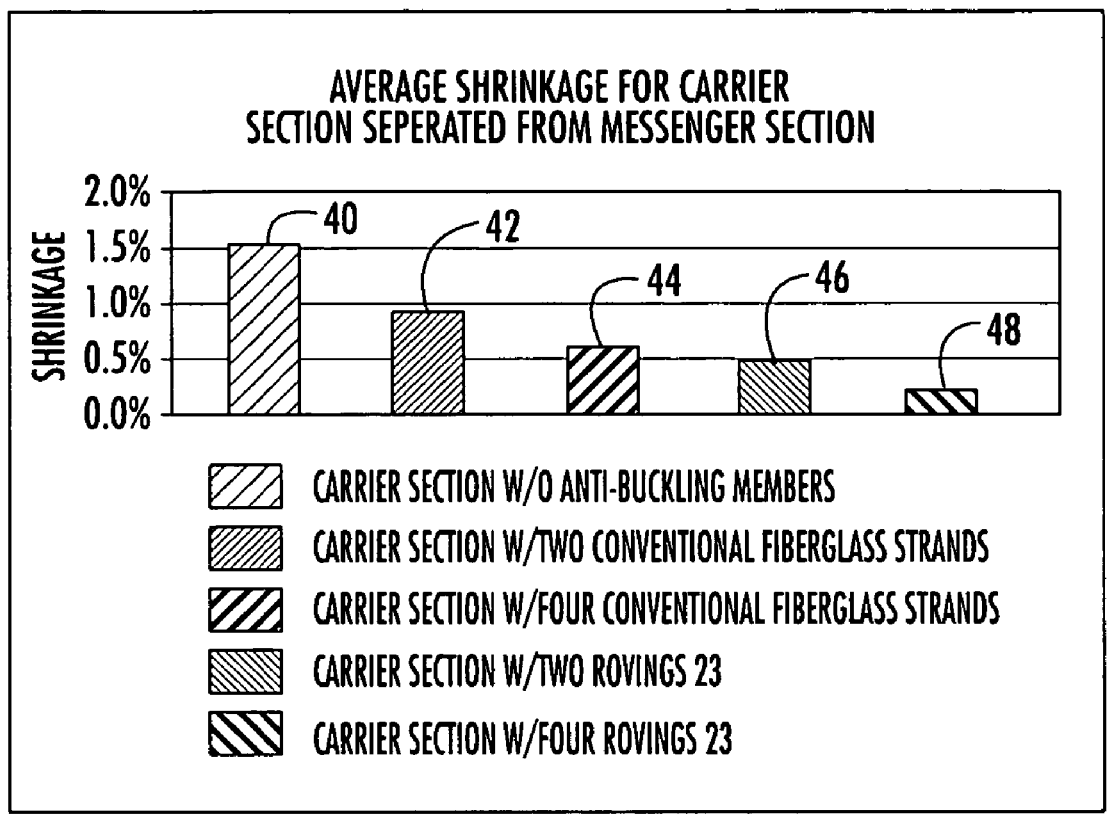
FIG. 4 is a bar graph depicting an average shrinkage during an average shrinkage test for a carrier section of the figure-eight fiber optic cable in FIG. 3 after being separated from the messenger section along with a variation of the cable in FIG. 3 and the average shrinkage for similar separated carrier sections of conventional figure-eight fiber optic drop cables.

FIG. 4 is a bar graph depicting an average shrinkage during an average shrinkage test for five different carrier sections that were separated from the messenger section of respective figure-eight drop cables. The average shrinkage test measured the average shrinkage by taking a 1 meter sample of the respective carrier sections that were separated from the messenger section of the respective figure-eight cables. Thereafter, the respective 1 meter carrier sections were placed in a thermal chamber set at about 70° C. for at least thirty minutes and then removed and allowed to cool to an ambient room temperature of about 20° C. Then, the respective lengths of the carrier sections were measured and an average shrinkage was calculated as a percentage for the respective carrier samples of the respective figure-eight cables. Since the average shrinkage of the carrier section was measured, the number of optical waveguides in the carrier section is irrelevant to the average shrinkage, but the number of optical waveguides in the carrier section can affect the delta attenuation during temperature cycling.

For a baseline comparison, a carrier section of a figure-eight cable that did not include any anti-buckling members was tested and is represented by bar 40. The baseline carrier section represented by bar 40 was different from the other cables tested because it had a buffer tube with an OD of about 2.5 mm, compared with the OD of 2.85 mm for the buffer tubes of the other cables. As shown, bar 40 depicts an average shrinkage of about 1.5% for this carrier section. It was discovered that this carrier section had extremely high maximum delta attenuation levels during temperature cycling at a reference wavelength of 1550 nm. Maximum delta attenuation during temperature cycling was on the order of 20.0 dB/20 meters and higher at about −40° C. for the construction depicted in bar 40, which had twelve optical waveguides within the tube. Consequently, the carrier section represented by bar 40 was unsuitable for separation from the messenger section because of the extremely high delta attenuation levels.

Bars 42 and 44 respectively represent carrier sections of figure-eight cables having two and four conventional fiberglass strands. The embodiment depicted by bar 42 had two fiberglass strands that were disposed about 180 degrees apart. As shown, bar 42 depicts an average shrinkage of about 0.9% for the carrier section. In the embodiment depicted by bar 44, the carrier section included four fiberglass strands. The fiberglass strands were disposed about 180 degrees apart in adjacent groups of two. As shown, bar 44 depicts an average shrinkage of about 0.6% for the carrier section. Thus, including fiberglass strands decreased the average shrinkage compared with the carrier section of bar 40.

Moreover, the average shrinkage was further decreased by increasing the number of fiberglass strands from two to four; however, this increases the material cost and manufacturing complexity for the cable. Maximum delta attenuation during temperature cycling for the configurations of bars 42 and 44 were respectively on the order of 0.6 dB/20 meters and 0.08 dB/20 meters at a reference wavelength of 1550 nm at about −40° C., with twelve optical waveguides in the carrier section. Generally speaking, higher maximum delta attenuations were observed when twelve optical waveguides were disposed within the carrier section compared with carrier sections having four optical waveguides within a similar carrier section. The conventional cable represented by bar 42 was on the design bubble since the shrinkage and maximum delta attenuation was an average value and some manufactured cables would be acceptable and others would fail, thereby reducing yield and requiring testing of each cable manufactured. The conventional cable represented by bar 44 (the conventional figure-eight cable having four fiberglass strands) had better performance for both the average shrinkage test and the maximum delta attenuation temperature cycling compared with the conventional cable of bar 42, but it increased the cost of the cable and is requires a more complex manufacturing operation. Additionally, it is possible for some of the conventional cables represented by bar 44 to fail due to, among other things, variability in the manufacturing process.

Bars 46 and 48 respectively represent carrier sections of figure-eight cables according to the present invention having two and four rovings 23. The embodiment depicted by bar 46 had two rovings 23 disposed about 180 degrees apart. As shown, bar 46 depicts an average shrinkage of about 0.5% for the carrier section. In the embodiment depicted by bar 48, the carrier section included four fiberglass strands. The four fiberglass strands were disposed about 180 degrees apart in adjacent groups of two. As shown, bar 48 depicts an average shrinkage of about 0.2% for the carrier section. Thus, carrier sections of figure-eight cables according to the present invention decreased the average shrinkage compared with the respective embodiments of bars 42 and 44. More surprisingly, maximum delta attenuation during temperature cycling for the configurations of bars 46 and 48 were respectively on the order of 0.03 dB/20 meters and 0.01 dB/20 meters at a reference wavelength of 1550 nm at about −40° C. Thus, the figure-eight cables of the present invention yielded surprising results compared with similar conventional figure-eight cables tested.

Optical waveguides 25 of the present invention preferably have an excess fiber length (EFL) that is about 0%. However, there are practical limits on the amount of EFL that can be used in a buffer tube or cavity of a tubeless cable. Generally speaking, all things being equal, the larger the inner diameter (ID) the more space that is available for EFL. However, placing more optical waveguides in the tube or cavity decreases the available space for EFL and can affect optical performance. Figure-eight cables of the present invention preferably have an EFL in the range of about 0.9% to about −0.03% in a tube or cavity. By way of example, a tube or cavity of a cable according to the present invention has an ID of about 4 mm or less, more preferably about 2 mm, with 12 or fewer fibers and an EFL of about 0.1% or less. But, of course other suitable EFLs, IDs, or numbers of fibers are possible with cables of the present invention. For instance, a tube or cavity of a cable can have an ID of about 6 mm or less, more preferably about 2–3 mm, and include 24 fibers and an EFL of about 0.1% or less. Additionally, the percent difference between the average carrier shrinkage and the EFL is about 0.9% or less, more preferably about 0.5% or less, and most preferably about 0.3% or less. For instance, if an average shrinkage of the carrier section is 0.5% and the EFL is 0.1% the difference therebetween is 0.4%.

Figure 5:
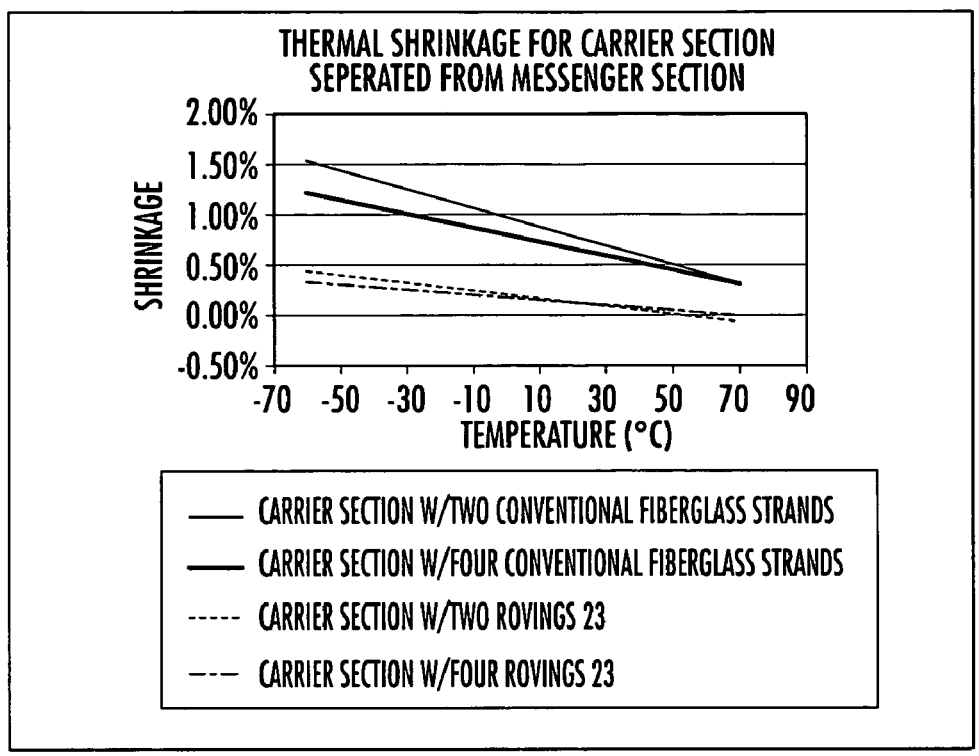
FIGS. 5 and 6 respectively are a line graph and a bar graph depicting an average coefficient of thermal expansion (CTE) for the carrier section of the cable in FIG. 3 after being separated from the messenger section along with a variation of the cable in FIG. 3 and the CTEs for similar separated carrier sections of conventional figure-eight fiber optic drop cables.

FIG. 5 is a line graph depicting a thermal shrinkage of four carrier sections separated from a messenger section over a predetermined temperature range. Calculating the slope of the lines in FIG. 5 yields a coefficient of thermal expansion (CTE) for the respective carrier section. The first two carrier sections depicted in FIG. 5, respectively represented by lines 52 and 54, had the same constructions as the two carrier sections having two and four fiberglass strands depicted in FIG. 4. The second two carrier sections, respectively represented by lines 56 and 58, had the same construction as the two carrier sections having two and four rovings 23 according to the present invention depicted in FIG. 4.

The thermal shrinkage test measured the thermal shrinkage of a carrier section of a figure-eight cable that was separated from the messenger section over the temperature range of about −60° C. to about 70° C. The thermal shrinkage test measured a 20 meter sample of the respective figure-eight cables prior to separating the respective carrier sections. Specifically, the respective cables were marked at their midpoints and at respective intervals of 1 meter. Thereafter, the carrier sections were separated from the messenger section and attached to a kiln-dried board having markings disposed 1 meter apart along the length. Specifically, the markings on the respective carrier sections were aligned with the markings on the board at a first end of both. At the first end, the carrier section was fixed so that it was unable to move, but the rest of the carrier section was free to shrink along the linearly attached length. Next, the board and carrier we placed into a thermal chamber and length measurements of the carrier section were measured as the temperature was varied over the temperature range. The results were then plotted obtain FIG. 5.

Figure 6:
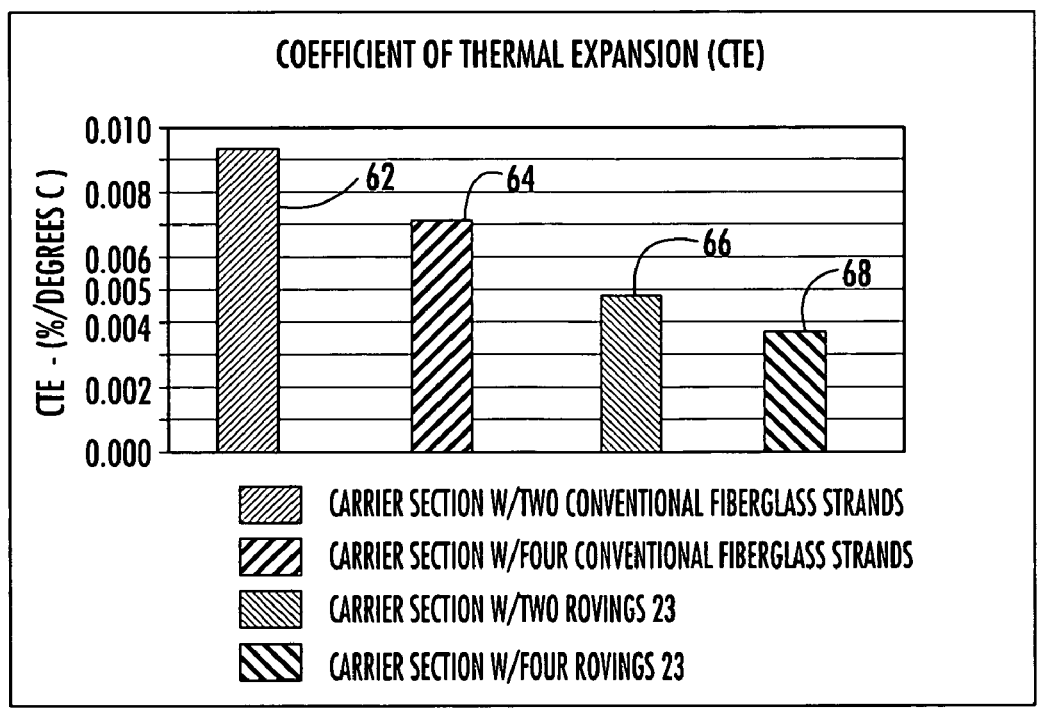

FIG. 6 is a bar graph summarizing the slopes of the lines of FIG. 5 which are the respective CTE for the tested carrier samples in the thermal shrinkage test. As shown in Table 1, the carrier sections of the figure-eight drop cables of the present invention surprisingly have a much smaller CTE, than comparable carrier sections of the conventional cables. Specifically, bar 66 has a CTE that is about 55% of the CTE of bar 62 and bar 68 has a CTE that is about 57% of the CTE of bar 64. Thus, the carrier sections of cables of the present invention had an average coefficient of thermal expansion (CTE) of the carrier section of about $5.0 \times 10^{-3}\%/°$ C. or less, and more preferably, the CTE is about $4.0 \times 10^{-3}\%/°$ C. or less.

TABLE 1

CTE values for FIG. 6

| Bar | CTE %/° C. |
|---|---|
| 62 | 0.009 |
| 64 | 0.007 |
| 66 | 0.005 |
| 68 | 0.004 |

Additionally, cables of the present invention can be advantageously coiled without inducing elevated levels of attenuation due to their relatively low-shrinkage in the carrier section. In other words, if a coiled figure-eight cable has elevated levels of shrinkage in the carrier section, the carrier section of the coiled cable tends to rotate to the inner diameter of the coil, thereby causing elevated levels of attenuation. Figure-eight cables of the present invention generally do have this problem so that they are suitable for coiling for slack storage.

Figure 7:
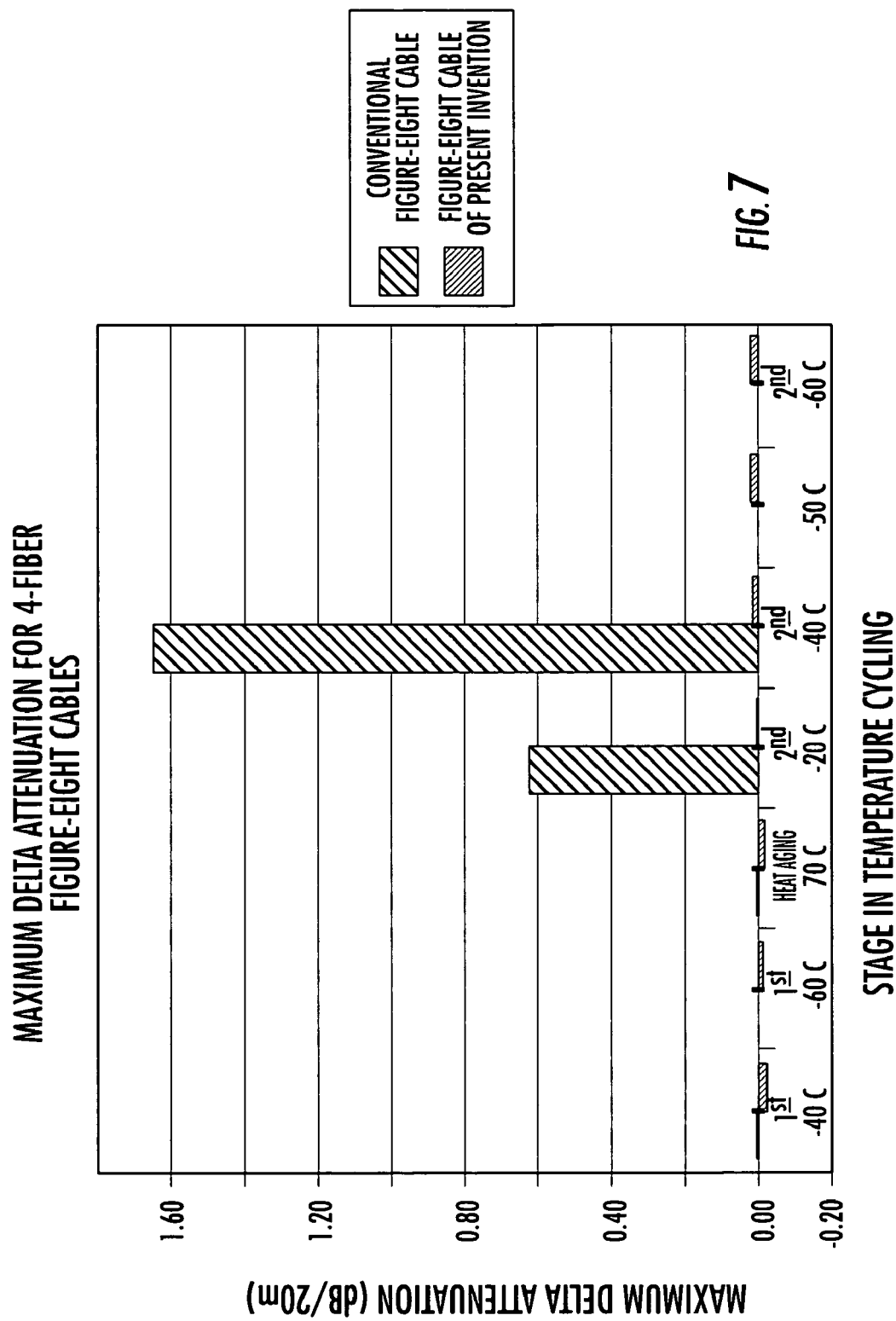
FIG. 7 is a bar graph-depicting maximum delta attenuation for the cable of FIG. 3 and a similar conventional fiber optic cable during thermal cycling testing at a reference wavelength of 1550 nm.
Figure 8:
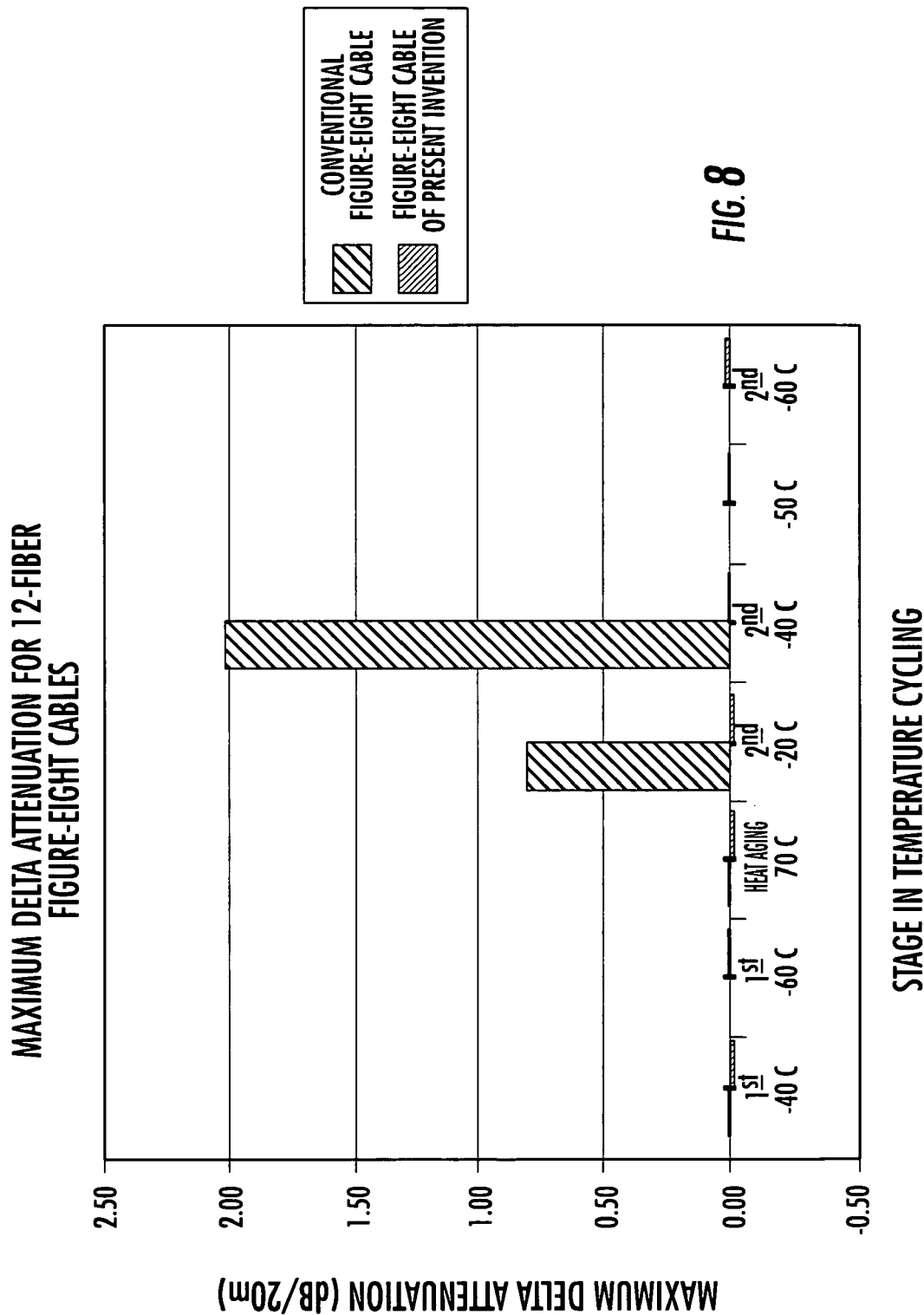
FIG. 8 is a bar graph depicting maximum delta attenuation for a cable similar to FIG. 3 except it included twelve optical fibers therein and a similar conventional fiber optic cable during thermal cycling testing at a reference wavelength of 1550 nm.

FIG. 7 depicts a bar graph showing maximum delta attenuations for the cable of FIG. 3 and a similar conventional fiber optic cable during thermal cycling testing at a reference wavelength of 1550 nm having. Likewise, FIG. 8 is a bar graph depicting maximum delta attenuation for a cable similar to FIG. 3 except it included twelve optical fibers therein and a similar conventional fiber optic cable during thermal cycling testing at a reference wavelength of 1550 nm. This temperature cycling was performed per the test procedures of ICEA 717/S-87-717, ANSI/S-87-640, and FOTP-3 with added measurements for the cables of the present invention at −50° C. and −60° C. to examine performance at these ultra-low temperatures. However, FIGS. 7 and 8 merely illustrate the interesting temperature cycling stages, namely, low temperature performance before heat aging and low temperature performance after heat aging.

The maximum delta attenuation testing was performed by taking a 60 meter sample of cable and separating a 20 meter carrier section of the cable roughly centered in the middle of the length. Hence, the maximum delta attenuation is reported for a length of 20 meters, rather than the typical value of dB/km. The separated carrier section was placed in a temperature chamber through suitable portals and the temperature cycling according to the above mentioned test procedure was initiated. Optical measurements were made using a suitable optical source and power meter. Some of the maximum delta attenuation values for FIGS. 7 and 8 are relatively low and are represented by small bars on FIGS. 7 and 8 that are not drawn to scale. Tables 2 and 3 respectively summarize the values of the maximum delta attenuations for FIG. 7 and FIG. 8 and have units of dB/20 m.

TABLE 2

Maximum Delta Attenuation Values for 4-fiber carrier sections of FIG. 7

| Cable | 1st −40° C. | 1st −60° C. | Heat Aging | −20° C. | 2nd −40° C. | −50° C. | 2nd −60° C. |
|---|---|---|---|---|---|---|---|
| Conventional | 0.00 | — | 0.00 | 0.61 | 1.64 | — | — |
| Present Invention | −0.01 | 0.00 | −0.01 | −0.01 | 0.00 | 0.00 | 0.01 |

TABLE 3

Maximum Delta Attenuation Values for 12-fiber carrier sections of FIG. 8

| Cable | 1st −40° C. | 1st −60° C. | Heat Aging | −20° C. | 2nd −40° C. | −50° C. | 2nd −60° C. |
|---|---|---|---|---|---|---|---|
| Conventional | 0.00 | — | 0.00 | 0.81 | 2.01 | — | — |
| Present Invention | −0.02 | −0.01 | −0.02 | 0.00 | 0.01 | 0.02 | 0.02 |

As shown by both FIGS. 7 and 8, the performance of the carrier sections of the conventional cables and the cables of the present invention have a similar performance before heat aging at 70° C. However, after heat aging the carrier sections of the present invention show a drastic difference in delta attenuation. As shown in both FIGS. 7 and 8, the optical performance of the conventional cables degrade at low temperatures after heat aging, thereby making them unsuitable for splitting the carrier section from the messenger section in outdoor applications. On the other hand, the carrier sections of the present invention have surprisingly low delta attenuation levels. Specifically, optical waveguides in cables of the present invention preferably have a maximum delta attenuation of about 0.3 dB/20 meters or less, and more preferably about 0.1 dB/20 meters or less, at a reference wavelength of about 1550 nm at a temperature of about −40° C. after heat aging at 70° C. Additionally, the cables of present invention maintain these performance levels down to a temperature of about −60° C. after heat aging.

Figure 9:
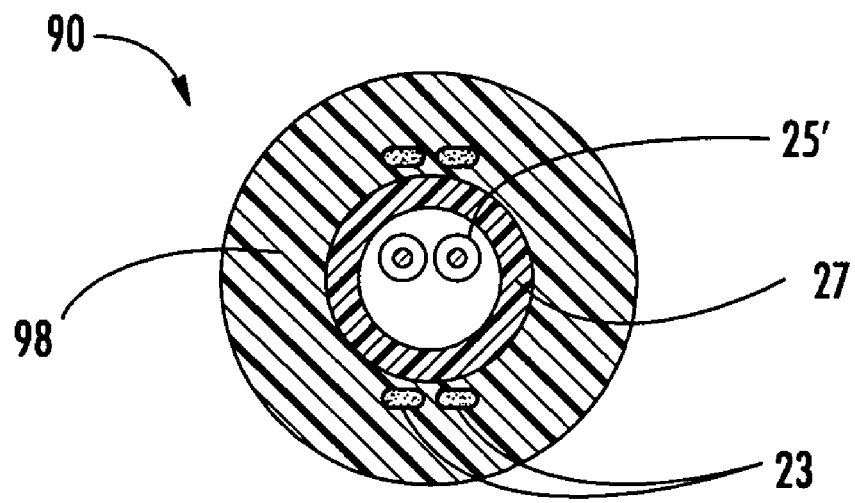
FIG. 9 is a cross-sectional view of another fiber optic cable configuration according to the concepts of the present invention.
Figure 10:
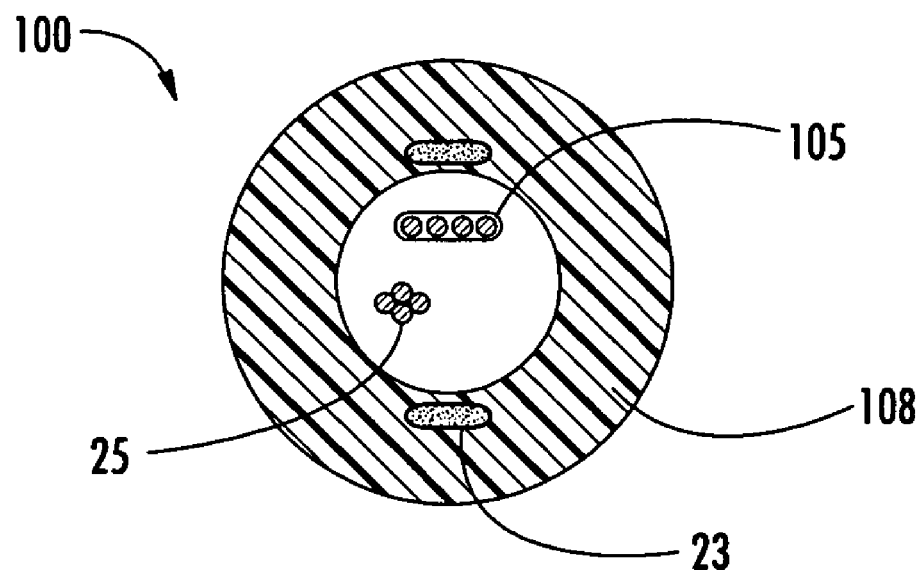
FIG. 10 is a cross-sectional view of yet another fiber optic cable configuration according to the concepts of the present invention.

Other cable configurations besides figure-eight cables are advantageous with the present invention. For instance, FIG. 9 depicts cable 90 according to the present invention. Cable 90 includes at least one optical waveguide 25', a buffer tube 27, a plurality of rovings 23, and a cable jacket 28. In other embodiments, the four rovings 23 of cable 90 can be embedded at generally symmetrically locations as well as any other suitable configurations. Optical waveguides 25' are single-mode optical fibers that have a buffer layer (not numbered); however, other types or configurations of optical fibers can be used. For example, optical fibers 25 can be multi-mode, pure-mode, erbium doped, polarization-maintaining fiber, other suitable types of light waveguides, and/or combinations thereof. For instance, each optical fiber 25 can include a silica-based core that is operative to transmit light and is surrounded by a silica-based cladding having a lower index of refraction than the core. Additionally, one or more coatings can be applied to optical fiber 25. For example, a soft primary coating surrounds the cladding, and a relatively rigid secondary coating surrounds the primary coating. The coating can also include an identifying means such as ink or other suitable indicia for identification and/or an anti-adhesion agent that inhibits the removal of the identifying means. Additionally, optical waveguides 25 can be disposed in ribbons or bundles as shown in FIG. 10. Suitable optical fibers are commercially available from Corning Incorporated of Corning, N.Y.

Buffer tube 27 is preferably constructed of a polymeric material and is suitably dimensioned for receiving the optical waveguides therein. However, other suitable materials and shapes can be used for buffer tube 27. Buffer tube 27 of the present invention can also include additives for improving flame-retardance; however, any other suitable additives can be used. Additionally, tube 27 can be, for example, extruded as a continuous unit or be manufactured from one or more polymeric flat tapes that are formed and sealed, thereby forming the buffer tube. Additionally, buffer tube 27 can have other suitable components or features such as a water-swellable material thereon or a ripcord within a tube wall. Likewise, cable jacket 28 is preferably constructed from a suitable polymeric material. Moreover, cable jacket can include ripcords embedded therein.

FIG. 10 depicts a cable 100 according to the present invention. Cable 100 is similar to cable 90, except it is a tubeless design. As depicted, cable 100 include a fiber optic ribbon 105 and a plurality of optical waveguides 25 in a bundle. Generally speaking, excluding the tube in cable 100 results in less expensive material cost for cable 100.

Cables of the present invention can also be preconnectorized in a factory environment, thereby simplifying field installation to the subscriber. For instance, cables can include at least one fiber optic connector as disclosed in U.S. patent application Ser. No. 10/765,428 filed on Jan. 27, 2004 titled "Preconnectorized Fiber Optic Drop Cables and Assemblies", the disclosure of which is incorporated herein by reference. Of course, the concepts of the present invention are also advantageous for cables not used for drop applications to the premises such as fiber to the curb (FTTC) applications.

Many modifications and other embodiments of the present invention, within the scope of the appended claims, will become apparent to a skilled artisan. For example, cables according to the present invention may have high fiber counts using optical waveguides can be formed in ribbons that are stacked in suitable configurations such as a stepped profile. Cables according to the present invention can also include more than one cable stranded, thereby forming a breakout cable. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical waveguides, but the inventive concepts of the present invention are applicable to other suitable optical waveguides and/or cable configurations.

That which is claimed:

1. A figure-eight fiber optic drop cable comprising:
    a messenger section, the messenger section having a strength component and a messenger jacket;
    a carrier section, the carrier section having at least one optical waveguide and at least one roving, the at least one roving being attached to the carrier jacket, the carrier section having an average shrinkage of about 0.5% or less during an average shrinkage test, wherein the average shrinkage test comprises taking a 1 meter sample of the carrier section that is separated from the messenger section and exposing the 1 meter sample of the carries section to a 70° C. environment in a thermal chamber for at least thirty minutes and then allowing the 1 meter sample to cool to about 20° C., thereafter the average shrinkage of the 1 meter sample is measured; and
    a web, the web connecting the messenger jacket with the carrier jacket.

2. The figure-eight fiber optic drop cable according to claim 1, wherein an average coefficient of thermal expansion (CTE) of the carrier section after being separated from the messenger section is about $5.0 \times 10^{-3}\%/°$ C. or less.

3. The figure-eight fiber optic drop cable according to claim 1, wherein an average coefficient of thermal expansion (CTE) of the carrier section after being separated from the messenger section is about $4.0 \times 10^{-3}\%/°$ C. or less.

4. The figure-eight fiber optic drop cable according to claim 1, wherein a maximum delta attenuation of the at least one optical waveguide of a separated carrier section during thermal cycling is about 0.3 dB/20 meters or less at a reference wavelength of about 1550 nm at a temperature of about −40° C.

5. The figure-eight fiber optic drop cable according to claim 1, wherein a maximum delta attenuation of the at least one optical waveguide of a separated carrier section during thermal cycling is about 0.1 dB/20 meters or less at a reference wavelength of about 1550 nm at a temperature of about −40° C.

6. The figure-eight fiber optic drop cable according to claim 1, the resin matrix of the at least one roving having a percentage by weight of about 7 percent or less, the resin matrix being a water-based acrylic composition that includes an ethylene-acrylic acid.

7. The figure-eight fiber optic drop cable according to claim 1, the carrier section having four or fewer rovings.

8. The figure-eight fiber optic drop cable according to claim 1, the carrier section having an average shrinkage of about 0.3% or less during a average shrinkage test, wherein the average shrinkage test comprises taking a 1 meter sample of the carrier section that is separated from the messenger section and exposing the 1 meter sample to a 70° C. environment in a thermal chamber for at least thirty minutes and then allowing the 1 meter sample to cool to about 20° C., thereafter the average shrinkage of the 1 meter sample is measured.

9. The figure-eight fiber optic drop cable according to claim 1, the at least one roving being embedded within the carrier jacket.

10. The figure-eight fiber optic drop cable according to claim 1, the carrier section being a tubeless design.

11. The figure-eight fiber optic drop cable according to claim 1, a difference between the average shrinkage and an excess fiber length (EFL) being about 0.5% or less.

12. A figure-eight fiber optic drop cable comprising:
a messenger section, the messenger section having a strength component and a messenger jacket;
a carrier section, the carrier section having at least one optical waveguide and at least one roving, the at least one roving having a resin matrix having a percent by weight of about 10 percent or less, and a carrier jacket, the at least one roving being attached to the carrier jacket, wherein an average coefficient of thermal expansion (CTE) of the carrier section after being separated from the messenger section is about $5.0 \times 10^{-3}$%/° C. or less, thereby preserving the optical performance of the at least one optical waveguide; and
a web, the web connecting the messenger jacket with the carrier jacket.

13. The figure-eight fiber optic drop cable according to claim 12, wherein a maximum delta attenuation of the at least one optical waveguide of a separated carrier section during thermal cycling is about 0.3 dB/20 meters or less at a reference wavelength of about 1550 nm at a temperature of about −40° C.

14. The figure-eight fiber optic drop cable according to claim 12, wherein a maximum delta attenuation of the at least one optical waveguide of a separated carrier section during thermal cycling is about 0.1 dB/20 meters or less at a reference wavelength of about 1550 nm at a temperature of about −40° C.

15. The figure-eight fiber optic drop cable according to claim 12, the resin matrix of the at least one roving having a percentage by weight of about 7 percent or less, the resin matrix being a water-based acrylic composition that includes an ethylene-acrylic acid.

16. The figure-eight fiber optic drop cable according to claim 12, the carrier section having four or fewer rovings.

17. The figure-eight fiber optic drop cable according to claim 12, the carrier section having an average shrinkage of about 1.0% or less during an average shrinkage test, wherein the average shrinkage test comprises taking a 1 meter sample of the carrier section that is separated from the messenger section and exposing the 1 meter sample to a 70° C. environment in a thermal chamber for at least thirty minutes and then allowing the 1 meter sample to cool to about 20° C., thereafter the average shrinkage of the 1 meter sample is measured.

18. The figure-eight fiber optic drop cable according to claim 12, the carrier section having an average shrinkage of about 0.5% or less during an average shrinkage test, wherein the average shrinkage test comprises taking a 1 meter sample of the carrier section that is separated from the messenger section and exposing the 1 meter sample to a 70° C. environment in a thermal chamber for at least thirty minutes and then allowing the 1 meter sample to cool to about 20° C., thereafter the average shrinkage of the 1 meter sample is measured.

19. The figure-eight fiber optic drop cable according to claim 12, wherein an average coefficient of thermal expansion (CTE) of the carrier section after being separated from the messenger section is about $4.0 \times 10^{-3}$%/° C. or less.

20. The figure-eight fiber optic drop cable according to claim 12, the at least one roving being embedded within the carrier jacket.

21. The figure-eight fiber optic drop cable according to claim 12, the carrier section being a tubeless design.

22. The figure-eight fiber optic drop cable according to claim 12, a difference between an average shrinkage of the carrier section that is separated from the messenger section and an excess fiber length (EFL) being about 0.5% or less.

23. A figure-eight fiber optic drop cable comprising:
a messenger section, the messenger section having a strength component and a messenger jacket;
a carrier section, the carrier section having at least one optical waveguide and at least one roving, the at least one roving having a resin matrix having a percent by weight of about 10 percent or less, the resin matrix being a water-based acrylic composition that includes an ethylene-acrylic acid, and a carrier jacket, the at least one roving being attached to the carrier jacket, thereby inhibiting buckling of the carrier section when separated from the messenger section so that a maximum delta attenuation of the at least one optical waveguide during thermal cycling of a separated carrier section is about 0.3 dB/20 meters or less at a reference wavelength of about 1550 nm at a temperature of about −40° C.; and
a web, the web connecting the messenger jacket with the carrier jacket.

24. The figure-eight fiber optic drop cable according to claim 23, the resin matrix of the at least one roving having a percentage by weight of about 7 percent or less.

25. The figure-eight fiber optic drop cable according to claim 23, the carrier section having four or fewer rovings.

26. The figure-eight fiber optic drop cable according to claim 23, the carrier section having an average shrinkage of about 1.0% or less during an average shrinkage test, wherein the average shrinkage test comprises taking a 1 meter sample of the carrier section that is separated from the messenger section and exposing the 1 meter sample to a 70° C. environment in a thermal chamber for at least thirty minutes and then allowing the 1 meter sample to cool to about 20° C., thereafter the average shrinkage of the 1 meter sample is measured.

27. The figure-eight fiber optic drop cable according to claim 23, the carrier section having an average shrinkage of about 0.5% or less during an average shrinkage test, wherein the average shrinkage test comprises taking a 1 meter sample of the carrier section that is separated from the messenger section and exposing the 1 meter sample to a 70° C. environment in a thermal chamber for at least thirty minutes and then allowing the 1 meter sample to cool to about 20° C., thereafter the average shrinkage of the 1 meter sample is measured.

28. The figure-eight fiber optic drop cable according to claim 23, wherein an average coefficient of thermal expansion (CTE) of the carrier section after being separated from the messenger section is about $5.0 \times 10^{-3}$%/° C. or less.

29. The figure-eight fiber optic drop cable according to claim 23, wherein an average coefficient of thermal expansion (CTE) of the carrier section after being separated from the messenger section is about $4.0 \times 10^{-3}$%/° C. or less.

30. The figure-eight fiber optic drop cable according to claim 23, wherein the maximum delta attenuation of the at least one optical waveguide of a separated carrier section during thermal cycling is about 0.1 dB/20 meters or less at a reference wavelength of about 1550 nm at a temperature of about −40° C.

31. The figure-eight fiber optic drop cable according to claim 23, the at least one roving being embedded within the carrier jacket.

32. The figure-eight fiber optic drop cable according to claim 23, the carrier section being a tubeless design.

33. The figure-eight fiber optic drop cable according to claim 23, a difference between an average shrinkage of the carrier section that is separated from the messenger section and an excess fiber length (EFL) being about 0.5% or less.

34. A fiber optic drop cable comprising:
at least one optical waveguide, the optical waveguide being disposed with the fiber optic cable;
at least one flexible roving, the at least one flexible roving having a resin matrix having a percent by weight of about 10 percent or less, the resin matrix being a water-based acrylic composition that includes an ethylene-acrylic acid; and
a cable jacket, wherein the at least one flexible roving is attached to the cable jacket, thereby inhibiting buckling of the cable jacket so that a maximum delta attenuation of the at least one optical waveguide during thermal cycling is about 0.3 dB/20 meters or less at a reference wavelength of about 1550 nm at a temperature of about −40° C.

35. The fiber optic drop cable according to claim 34, the resin matrix of the at least one flexible roving having a percentage by weight of about 7 percent or less.

36. The fiber optic drop cable according to claim 34, the fiber optic cable having an average shrinkage of about 1.0% or less during an average shrinkage test, wherein the average shrinkage test comprises taking a 1 meter sample and exposing the 1 meter sample to a 70° C. environment in a thermal chamber for at least thirty minutes and then allowing the 1 meter sample to cool to about 20° C., thereafter the average shrinkage of the 1 meter sample is measured.

37. The fiber optic drop cable according to claim 34, wherein an average coefficient of thermal expansion (CTE) of the fiber optic cable is about $5.0 \times 10^{-3}$%/° C. or less.

38. The fiber optic drop cable according to claim 34, the fiber optic cable being a tubeless design.

39. The fiber optic drop cable according to claim 34, wherein a maximum delta attenuation of the at least one optical waveguide during thermal cycling is about 0.1 dB/20 meters or less at a reference wavelength of about 1550 nm at a temperature of about −40° C.

40. The fiber optic drop cable according to claim 34, the cable having two rovings and a difference between an average shrinkage of the cable and an excess fiber length (EFL) being about 0.5% or less.

41. A fiber optic drop cable comprising:
at least one optical waveguide, the optical waveguide being disposed within the fiber optic cable;
at least one flexible roving, the at least one roving having a resin matrix having a percent by weight of about 10 percent or less; and
a cable jacket, the at least one flexible roving being attached to the cable jacket, wherein an average coefficient of thermal expansion (CTE) of the fiber optic cable is about $5.0 \times 10^{-3}$%/° C. or less, thereby preserving the optical performance of the at least one optical waveguide.

42. The fiber optic drop cable according to claim 41, wherein a maximum delta attenuation of the at least one optical waveguide during thermal cycling is about 0.3 dB/20 meters or less at a reference wavelength of about 1550 nm at a temperature of about −40° C.

43. The fiber optic drop cable according to claim 41, wherein a maximum delta attenuation of the at least one optical waveguide during thermal cycling is about 0.1 dB/20 meters or less at a reference wavelength of about 1550 nm at a temperature of about −40° C.

44. The fiber optic drop cable according to claim 41, the resin matrix of the at least one flexible roving having a percentage by weight of about 7 percent or less, the resin matrix being a water-based acrylic composition that includes an ethylene-acrylic acid.

45. The fiber optic drop cable according to claim 41, the fiber optic cable having an average shrinkage of about 1.0% or less during an average shrinkage test, wherein the average shrinkage test comprises taking a 1 meter sample of the fiber optic cable and exposing the 1 meter sample to a 70° C. environment in a thermal chamber for at least thirty minutes and then allowing the 1 meter sample to cool to about 20° C., thereafter the average shrinkage of the 1 meter sample is measured.

46. The fiber optic drop cable according to claim 41, the fiber optic cable being a tubeless design.

47. The fiber optic drop cable according to claim 41, the cable having two rovings and a difference between an average shrinkage of the cable and an excess fiber length (EFL) being about 0.5% or less.

48. A fiber optic drop cable comprising:
at least one optical waveguide;
at least one flexible roving;
a cable jacket, the at least one flexible roving being attached to the cable jacket, the cable having an average shrinkage of about 0.5% or less during an average shrinkage test, wherein the average shrinkage test comprises taking a 1 meter sample of the cable and exposing the 1 meter sample of the cable to a 70° C. environment in a thermal chamber for at least thirty minutes and then allowing the 1 meter sample to cool to about 20° C., thereafter the average shrinkage of the 1 meter sample is measured.

49. The fiber optic drop cable according to claim 48, wherein an average coefficient of thermal expansion (CTE) of the cable is about $5.0 \times 10^{-3}$%/° C. or less.

50. The fiber optic drop cable according to claim 48, wherein a maximum delta attenuation of the at least one optical waveguide during thermal cycling is about 0.3 dB/20 meters or less at a reference wavelength of about 1550 nm at a temperature of about −40° C.

51. The fiber optic drop cable according to claim 48, wherein a maximum delta attenuation of the at least one optical waveguide during thermal cycling is about 0.1 dB/20 meters or less at a reference wavelength of about 1550 nm at a temperature of about −40° C.

52. The fiber optic drop cable according to claim 48, the resin matrix of the at least one flexible roving having a percentage by weight of about 7 percent or less, the resin matrix being a water-based acrylic composition that includes an ethylene-acrylic acid.

53. The fiber optic drop cable according to claim 48, the carrier section being a tubeless design.

54. The fiber optic drop cable according to claim 48, the cable having two rovings and a difference between the average shrinkage of the cable and an excess fiber length (EFL) being about 0.5% or less.

* * * * *